United States Patent [19]

Rossi et al.

[11] Patent Number: 5,328,961

[45] Date of Patent: * Jul. 12, 1994

[54] ELECTRICALLY CONDUCTIVE POLYTHIOPHENECARBONYL POLYMER NETWORKS

[75] Inventors: Giuseppe Rossi, Dearborn; Susan M. Ward, Ann Arbor; Henk van Oene, Westland; Joseph W. Holubka, Livonia, all of Mich.

[73] Assignee: Ford Motor Company, Dearborn, Mich.

[ * ] Notice: The portion of the term of this patent subsequent to Oct. 19, 2010 has been disclaimed.

[21] Appl. No.: 1,708

[22] Filed: Jan. 7, 1993

[51] Int. Cl.[5] .................................... C08F 28/06
[52] U.S. Cl. ..................... 525/206; 525/203; 525/326.7; 525/327.2; 526/256; 526/258; 252/500
[58] Field of Search ............. 525/206, 203, 326.7, 525/327.2; 526/256, 258; 252/500

[56] References Cited

U.S. PATENT DOCUMENTS

| | | | |
|---|---|---|---|
| 3,380,982 | 4/1968 | Berlin et al. | 525/383 |
| 3,663,439 | 5/1972 | Frangatos | 525/340 |
| 3,712,877 | 1/1973 | St. Paul et al. | 525/340 |
| 3,803,266 | 4/1974 | Kahle et al. | 525/340 |
| 3,808,173 | 4/1974 | Orihashi | 525/340 |
| 4,026,851 | 5/1977 | Greene | 526/328 |
| 4,043,948 | 8/1977 | Rakshys, Jr. et al. | 525/340 |
| 4,078,130 | 3/1978 | Goswami | 526/17 |
| 4,382,130 | 5/1983 | Ellison et al. | 525/340 |
| 4,399,263 | 8/1983 | Brodoway | 525/382 |
| 4,539,136 | 9/1985 | Broekhuis | 525/340 |
| 4,599,194 | 5/1986 | Frommer et al. | 252/500 |
| 4,617,228 | 10/1986 | Newman et al. | 428/265 |
| 4,617,353 | 10/1986 | Myers | 525/245 |
| 4,833,232 | 5/1989 | Chiang | 528/423 |
| 4,839,322 | 6/1989 | Yodice | 502/159 |
| 4,880,508 | 11/1989 | Aldissi | 252/500 |
| 4,929,389 | 5/1990 | Aldissi | 252/500 |
| 4,931,509 | 6/1990 | Yagishita et al. | 525/327.3 |
| 4,933,106 | 6/1990 | Sakai et al. | 252/500 |
| 4,933,384 | 6/1990 | Poos | 525/326.7 |
| 4,937,305 | 6/1990 | Okamoto et al. | 525/374 |

FOREIGN PATENT DOCUMENTS

| | | | |
|---|---|---|---|
| 3418093A1 | 11/1985 | Fed. Rep. of Germany | 252/500 |
| 1-132622 | 5/1989 | Japan | 525/340 |

OTHER PUBLICATIONS

Callstrom et al, Chemical Abstracts, vol. 109, No. 231663d (1988).
Diaz et al, "Electrochemistry of Conducting Polypyrrole Films," J. J. Electroanal. Chem. 129:115–132.
Roncali, Chem Rev. 1992, 711–738, "Conjugated Poly(thiophenes): Synthesis, Functionalization, and Applications".

Primary Examiner—James J. Seidleck
Assistant Examiner—Patrick R. Delaney
Attorney, Agent, or Firm—Lorraine S. Melotik; Roger L. May

[57] ABSTRACT

Electrically conductive polythiophenecarbonyl polymer networks are provided comprising conjugated crosslinks between polythiophenecarbonyl polymer segments of the network. The network can be formed by crosslinking carbonyl functional polythiophenecarbonyl polymers, such as by self-crosslinking condensation reaction or crosslinking condensation reaction with conjugated diylide and/or conjugated polyamine. The carbonyl functional polythiophenecarbonyl polymers can be prepared by polymerization, such as by electropolymerization of carbonyl functional thiophene monomers (the carbonyl functionality generally being protected during polymerization) and, optionally, suitable conjugated copolymerization monomers such as thiophene, pyrrole and/or carbonyl functional pyrrole.

12 Claims, No Drawings

ELECTRICALLY CONDUCTIVE POLYTHIOPHENECARBONYL POLYMER NETWORKS

INTRODUCTION

The present invention relates to novel polymer networks and, more particularly, to polythiophenecarbonyl polymer networks having electrical conductivity.

BACKGROUND OF THE INVENTION

Electrically conductive polymers are increasingly finding application in electrical and electronic devices, for example, as organic electrodes and the like. Enhanced conductivity is desirable to lower dissipation and, more generally, to meet the needs of more demanding applications. Electrically conductive polymers are commonly made by electropolymerization at an electrode. Typically, essentially insoluble films are produced from suitable unsaturated reactant materials forming conjugated polymer chains. The polymer chains can be made conductive, or more conductive, by doping with known materials, such as iodine, $AsF_6$ anions, etc. The dopant is thought to facilitate the transfer of charge (electrons or holes) along the conjugated polymer chain or, to a limited extent, from one polymer chain to another. Conductivity is thought to be limited by such chain-to-chain hopping processes. In principle, higher conductivities would perhaps be achievable by increasing the length of the conjugated polymer chains. If conjugated chains suitable for conductive polymers are made by electrode polymerization of reactant monomers in a good solvent for the short polymer chains, they will dissolve from the surface of the electrode into the solvent resulting in disadvantageously short polymer chains. Typically, electropolymerization synthesis procedures result in relatively short conjugation length.

Also, the polymerization process typically generates polymers with a certain level of defects in the conjugation, for example, through the introduction of $sp^3$ carbons into the backbone of the polymer intended to be conjugated entirely through unsaturated $sp^2$ and/or sp sites. Such defects in the polymerization process limit the conductivity of the polymer material. Conductive polymers may be prepared using conventional solution based polymerization processes. These processes are known to suffer potentially the disadvantage of generating the above mentioned $sp^3$ defects in the polymer backbone, reducing the conductivity of the polymer.

The use of electropolymerization to produce conducting polypyrrole polymer films is discussed by Diaz et al in *Electrochemistry of Conducting Polypyrrole Films*, J. Electroanal. Chem., 129 (1981) 115-132. The Diaz et al article describes the electropolymerization reaction process and reports the production of polypyrrole polymer films which are highly conducting when in the oxidized state. Specifically, polypyrrole polymer films are prepared by electropolymerization of pyrrole on a platinum electrode surface in an acetonitrile electrolyte solution. In addition, the preparation of poly-N-methylpyrrole and poly-N-phenylpyrrole films are described.

SUMMARY OF THE INVENTION

In accordance with a first aspect of the present invention, electrically conductive polymer networks are provided, specifically, novel polythiophenecarbonyl polymer networks. More specifically, the polythiophenecarbonyl polymer networks of the invention, which may comprise conductivity enhancing dopant, have conjugated crosslinking between conjugated polythiophenecarbonyl polymer segments within the network. Transfer of charge carriers in the network functions along the conjugated polymer backbone segments by the same mechanisms found applicable to single chain polymers. While not wishing to be bound by theory, conductivity in the polymer networks of the present invention is presently understood to be enhanced by the conjugated crosslinks. The conjugated crosslinks provide, in effect, an uninterrupted conjugated structure with the conjugated polythiophenecarbonyl polymer backbone segments, thus bypassing any $sp^3$ defects. Certain embodiments of the invention provide electrically conductive polymer networks suitable for use in electrical and electronic devices and/or have properties such as non-linear optical effects, suitable for application in electro-optical switches, modulators or sensors. One preferred application for electrically conductive polymer networks of the invention is as gasket material to provide EMF shielding.

According to another aspect of this invention, the polythiophenecarbonyl polymer network is formed as the condensation crosslinking reaction product of carbonyl functional polythiophenecarbonyl polymers. Such condensation crosslinking reaction may be a self-crosslinking reaction or may employ a conjugated crosslinker as a second reactant.

According to another aspect of the invention, the carbonyl functional polythiophenecarbonyl polymers are the polymerization reaction product of reactant monomers comprising carbonyl functional thiophene monomers and, optionally, conjugated copolymerization monomers. Preferably such polymerization is carried out by electropolymerization of the reactant monomers. As discussed further below, the carbonyl functionality group may be labile, and should be reversibly protected by a protecting group during the polymerization reaction. The free carbonyl functionality is then regenerated subsequent to polymerization for the crosslinking reaction. Additional aspects and advantages of the invention will be better understood in light of the following discussion wherein certain preferred embodiments of the invention are described in detail.

DETAILED DESCRIPTION OF CERTAIN PREFERRED EMBODIMENTS

It will be understood from the foregoing summary of the invention and from the following description of preferred embodiments, that the polythiophenecarbonyl polymer network generally will not have free carbonyl functionality. It is generally preferred that all or substantially all free carbonyl functionality be consumed in condensation crosslinking reaction to form conjugated crosslinks between the conjugated polymer segments of the network. Thus, the term polythiophenecarbonyl polymer network is used to mean the network which can be prepared as the conjugated crosslinked reaction product of carbonyl functional polythiophenecarbonyl polymers and/or equivalent or analogous chemical entities by whatever synthesis route produced.

The polythiophenecarbonyl polymer segments of preferred polymer networks of the invention are fully conjugated via $sp^2$ sites. That is, they provide, ideally, an uninterrupted path of conjugated bonds along substantially their entire length. In accordance with known techniques, the monomer-to-monomer bonds of the polymer segments preferably are located in each instance between the carbon atoms adjacent to the sulfur atom of the thiophene ring. The polymer networks optionally comprise dopant material to enhance electrical conductivity. Numerous suitable dopant materials are well known and will be apparent to those skilled in the art in view of the present disclosure. Exemplary dopant materials for use in the polymer networks of the present invention include iodine, $AsF_6$ anions and the like. In that regard, it should be understood that all references herein to reactant monomers, including both carbonyl functional thiophene and the conjugated copolymerization monomers discussed further below, may be substituted in accordance with the teachings of U.S. Pat. No. 4,929,389 to produce self-doped polymers. Certain preferred embodiments of the polythiophenecarbonyl polymer networks of the present invention are doped to have greater electrical conductivity.

Similarly, it should be understood that the carbonyl functional thiophene monomers and/or the conjugated copolymerization monomers may be modified to provide enhanced solubility in water in accordance with the technology of U.S. Pat. No. 4,929,389, the teaching of which is incorporated herein by reference. Thus, reference below to thiophene monomers will be understood to include analogous monomers having, for example, an alkyl group substituted for a hydrogen atom located in the beta position of the thiophene ring and having a surfactant molecule at the end of the alkyl chain. In addition, in accordance with such teaching, resultant polymers of this type having 8 or more carbon atoms in the alkyl chain in certain embodiments exhibit liquid crystalline behavior, resulting in high electrical anisotropy. Of course, such functionality must be selected so as to be compatible with polymerization and crosslinking reactions employed to produce polythiophenecarbonyl polymer networks of this invention.

In addition to the fully conjugated polythiophenecarbonyl polymer segments, it is a highly significant additional feature of the polymer networks of the invention that they comprise conjugated crosslinks, meaning crosslinks forming uninterrupted conjugation between the polythiophenecarbonyl polymer segments. The short conjugated crosslinks of the invention significantly enhance electrical conductivity in the network. Without wishing to be bound by theory, it is presently understood that the conjugated crosslinks provide an essentially infinite conjugated structure wherein innumerable parallel and alternative conductivity paths are provided to overcome or minimize the effect of any conjugation defects (e.g., $sp^3$ link defects) in the polythiophenecarbonyl polymer segments, i.e., the backbone segments of the network.

In view of the present disclosure, various suitable synthesis routes will be apparent to those skilled in the art for preparing the polythiophenecarbonyl polymer networks of the invention. In accordance with certain preferred embodiments of the invention, synthesis of such polymer networks is accomplished by the condensation crosslinking reaction of carbonyl functional polythiophenecarbonyl polymers. The carbonyl functional polythiophenecarbonyl polymers preferably have an average polymer chain length of 20 to 30 monomer units and are the electropolymerization reaction product of reactant monomers comprising carbonyl functional thiophene monomers and, optionally, conjugated copolymerization monomers in mole ratio of from 1:20 to 20:1. It will be understood by those skilled in the art that reference herein to the thiophene monomers as being "carbonyl functional" is intended to include both thiophene monomers having free carbonyl functionality and those having carbonyl functionality which has been reversibly protected by reaction with a protecting group. Under some polymerization procedures, including some electropolymerization procedures, the carbonyl group may be labile. For example, in the case of thiophenecarboxaldehyde, discussed below, the aldehyde group preferably is protected as the acetal, which may be prepared by reacting the thiophenecarboxaldehyde monomer with alkylene glycol, preferably ethylene glycol, in the presence of pTSA. The free carbonyl is then regenerated after polymerization. In the example of the aldehyde group protected as an acetal group during electropolymerization, the aldehyde preferably would be regenerated after electropolymerization by acid hydrolysis.

Preferred carbonyl functional thiophene monomers are selected from those of formula (prior to any protecting reaction):

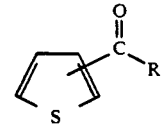

wherein the carbonyl group is substituted at the 2- or 3-position in the thiophene ring and R is hydrogen, an aromatic group or an alkyl group having up to 8 carbons. The size of the substitution group R in the above formula is limited primarily by steric hindrance, and in some applications larger R groups may be found acceptable for use. Most preferred for use as the carbonyl functional thiophene monomers are the reaction product of alkylene glycol, most preferably ethylene glycol, with 2-thiophenecarboxaldehyde, 3-thiophenecarboxaldehyde, or any mixture thereof. In such reaction product, the aldehyde functionality is protected as an acetal group. As described above, the free aldehyde functionality would be regenerated by acid hydrolysis following polymerization. In view of the present disclosure, the suitability of numerous analogues and other equivalent monomers including, for example, substituted thiophenecarbonyl monomers such as Cl or other halide substituted thiophenecarbonyl monomers, will be apparent to those skilled in the art. Preferably, the carbonyl functional thiophene monomers are polymerized together with conjugated copolymerization monomers selected from thiophene, pyrrole, carbonyl functional pyrrole (the carbonyl functionality generally being protected during the polymerization reaction) and any mixture thereof. Other suitable conjugated copolymerization monomers will be apparent to those skilled in the art, who also will recognize that conjugated copolymerization monomers need not be employed in the polymerization. To control the degree of crosslinking, however, it is preferred to employ non-carbonyl functional copolymerization monomers, such as thiophene and pyrrole, together with the carbonyl functional monomers in a ratio of from about 1:20 to about 20:1. More preferably, the non-carbonyl functional conjugated copolymerization monomers are used with the carbonyl functional thiophene monomers in a ratio of from about 20:1 to about 1:1.

Suitable electropolymerization reaction procedures for preparing the crosslinkable carbonyl functional polythiophenecarbonyl polymers are familiar to those skilled in the art, and are carried out for polymerization in the present invention with well known materials and techniques. Suitable materials and techniques are disclosed, for example, in the Diaz et al article identified above, the disclosure of which is incorporated herein by reference. There are numerous commercially available solvents suitable for such electropolymerization. Exemplary solvents include DMSO, methyl pyrrolidine, DMF, acetonitrile and other highly polar solvents. Additional suitable solvents will be readily apparent to those skilled in the art in view of the present disclosure. The carbonyl functional polythiophenecarbonyl polymers may also be prepared using conventional solution-based polymerization processes. Again, such processes are well known to those skilled in the art and will be readily applied to this invention in view of the present disclosure. In the electropolymerization process, the polythiophenecarbonyl polymer generally will not form a deposited film on the surface of the electrode. This will depend in part on the solubility of the polymer in the solvent used in the electropolymerization process. In certain applications, however, it may be desirable to form the electrically conductive polythiophenecarbonyl network on the surface of a workpiece suitable for use as an electrode in the electropolymerization process. In one such application, a polythiophenecarbonyl polymer network film is formed as an electrically conductive film on a glass surface intended for use as an electrochromic panel. Where the electropolymerization takes place in a solvent which is a good solvent for the resulting carbonyl functional polythiophenecarbonyl polymers, the polymerized chains will be dissolved from the surface of the electrode at which they are formed during the electropolymerization process. In accordance with certain preferred embodiments of the invention, the carbonyl functional polythiophenecarbonyl polymers have an average polymer chain length of 10 to 30 monomer units.

Crosslinking of the carbonyl functional polythiophenecarbonyl polymers can be accomplished by condensation reaction of the carbonyl functionality. The term "conjugated crosslinkers" and all related terms used in this discussion will be understood by those skilled in the art to mean crosslinkers which provide an unbroken path of conjugation from one polymer segment to another within the polythiophenecarbonyl polymer network. This feature represents a highly significant advance in the art over corresponding uncrosslinked polymers, which may have unintended conjugation defects etc., as discussed above, and even over conjugated polymer segments in a network having non-conjugated crosslinks. In accordance with certain embodiments of the invention, the crosslinking reaction mixture, optionally including dopant, after deprotecting the polymers, can be applied in the unreacted, that is, uncrosslinked, condition to a workpiece intended to receive an electrically conductive polymer coating. After application to such workpiece surface, the crosslinking reaction can proceed, optionally with heating, resulting in a hardened, or at least form-stable, electrically conductive polymer network layer. Numerous other uses and alternative modes of application will be apparent to those skilled in the art in view of the present disclosure.

In accordance with certain preferred embodiments of the invention, the carbonyl functionality is an aldehyde functional group and the crosslinking is accomplished by condensation reaction of such aldehyde functional group with conjugated diylide. The crosslinking agent may be added neat or with solvent. Preferably the crosslinking reaction occurs with heating to accelerate the crosslinking reaction. Suitable diylide crosslinking agents are commercially available and/or readily prepared, and will be apparent to those skilled in the art in view of the present disclosure. Preferred diylides can be generated as the reaction product of an aromatic diphosphonium salt with a base. A wide range of such diylides are suitable for use in the crosslinking reaction. An exemplary diylide is prepared by treating p-xylylene bis(triphenylphosphonium halide) with base, preferably p-xylylene bis(triphenylphosphonium bromide). Those skilled in the art will recognize that certain nitrogen and sulfur analogues of the aforesaid phosphorous type diylide crosslinkers also may be employed as crosslinking reactants for producing polymer networks of the present invention. For carbonyl functional polythiophenecarbonyl polymers soluble in organic solvent, phenyl lithium or alkyl lithium may be used as the base, for example, butyl lithium, methyl lithium and the like. A suitable alternative is to generate the diylide under phase-transfer catalyzed conditions employing, for example, sodium hydroxide as the base. Other bases suitable for generating the diylide include, for example, potassium t-butoxide, potassium carbonate/crown ether, lithium amide, and lithium diisopropylamide. The diylide, once formed, need not be isolated, but rather can be reacted in situ with the polythiophenecarbonyl polymers.

In accordance with certain other preferred embodiments of the invention, crosslinking is accomplished by condensation reaction of the carbonyl functionality with a polyamine crosslinker. Numerous suitable di- and other polyamine crosslinkers are commercially available and/or readily prepared, and will be apparent to those skilled in the art in view of the present disclosure. An essential feature of such preferred embodiments is that the —N=C— group that results from the direct condensation of the carbonyl functionality with the amine group of the crosslinker is in conjugation with other —N=C— groups within the crosslinker and in conjugation with the polythiophenecarbonyl polymer segments crosslinked in the network. This provides the uninterrupted network of conjugation, and the advantages resulting therefrom, discussed above. Exemplary polyamine crosslinkers for use in preparing the polythiophenecarbonyl polymer networks of the invention include 1,2-diaminobenzene, 1,4-diaminobenzene, and their corresponding toluene and xylene analogues. Also suitable are di- and polyamines in which the amine groups are on separate aromatic rings joined through conjugation, for example, ci5- and trans-4,4'-diaminostilbenes. Numerous additional polyamine crosslinkers will be apparent to those skilled in the art.

The crosslinking reaction employing polyamine crosslinker may be carried out using techniques well known to those skilled in the art. Preferably the crosslinking reaction is carried out in an appropriate solvent, for example, benzene or toluene. Such technique is applicable, for example, for crosslinking carbonyl functional polythiophenecarbonyl polymers formed in an electropolymerization process, as discussed above, or other conventional polymerization techniques. Preferably heat is added to the crosslinking reaction with the polyamine crosslinker, both to increase the rate of the crosslinking reaction and to drive off solvents and by-products, such as $H_2O$, produced by the reaction between amine and carbonyl functionality.

The conjugated crosslinker may be a suitably functionalized polymer. That is, the crosslinking functionality may be provided as free functionality on a polymer chain, for example, as free amino functionality, ylide functionality or both, on a polythiophene or polypyrrole polymer. Such polymers can be prepared by polymerization of thiophene and/or pyrrole monomers carrying suitable (optionally protected) ylide and/or amine functionality. Exemplary polymer crosslinkers include the 20-30 monomer unit electropolymerization reaction product of 2-aminopyrrole, 3-aminopyrrole, 2-thiopheneamine, 3-thiopheneamine and any mixture thereof. The amine functionality should be protected as the imine during electropolymerization (e.g., by prior reaction with acetone or the like in the presence of pTSA), and then returned to the free amine by acid hydrolysis after electropolymerization. Numerous such polymer crosslinkers and their preparation and use will be apparent to those skilled in the art in view of the present disclosure, the significant feature being, as discussed above, creation of an unbroken path of conjugation within and between the polymer segments of the network.

In accordance with certain other preferred embodiments of the invention, the carbonyl functional polythiophenecarbonyl polymers are self-crosslinked. Specifically, the polymers are crosslinked through direct condensation through a carbonyl functional group of one polymer with an equivalent functional group on another polymer. Such self-crosslinking reaction can be accomplished through the action of trialkylphosphite, preferably having an alkyl group of 1 to 6 carbons, or equivalent reagent. Most preferably triethylphosphite is used. In such self-crosslinking process, two carbonyl groups, preferably two aldehyde groups —CHO, combine to form one conjugated —CH=CH— crosslinking group. The double bond so formed will be in conjugation with the conjugated thiophene rings of adjacent polythiophenecarbonyl polymer segments. As discussed above, this will form a polymer network having innumerable parallel conjugation paths for electrical conductivity.

In a typical self-crosslinking process, carbonyl functional polythiophenecarbonyl polymers as described above, prepared through conventional synthesis techniques, e.g. as a deposit on an electrode surface via electropolymerization, is treated with an excess of triethylphophite or the like at elevated temperatures, preferably greater than 100° C. The resulting polythiophenecarbonyl polymer network can be separated from the phosphite either under vacuum or by washing with any of a variety of organic solvents. Alternative techniques and processes for such self-crosslinking reaction will be apparent to those skilled in the art in view of the present disclosure.

The foregoing description of the invention has presented certain preferred embodiments for purposes of illustration. The description of such preferred embodiments is not intended to be exhaustive or to limit the scope of the invention. Various modifications are possible, many of which will be apparent to those skilled in the art in view of the above teaching, without departing from the true scope of the invention which is intended to be defined by the following claims.

We claim:

1. An electrically conductive polythiophenecarbonyl polymer network comprising conjugated crosslinking between polythiophenecarbonyl polymer segments.

2. The electrically conductive polythiophenecarbonyl polymer network of claim 1 comprising the condensation crosslinking reaction product of carbonyl functional polythiophenecarbonyl polymers with conjugated diylide crosslinker.

3. The electrically conductive polythiophenecarbonyl polymer network of claim 2 wherein the carbonyl functional polythiophenecarbonyl polymers have an average polymer chain length of 20 to 30 monomer units and are the electropolymerization reaction product of reactant monomers comprising carbonyl functional thiophene monomers and conjugated copolymerization monomers in mole ratio of from 1:20 to 20:1.

4. The electrically conductive polythiophenecarbonyl polymer network of claim 3 wherein the carbonyl functional thiophene monomers are selected from the group consisting of monomers of formula, prior to optional protecting reaction:

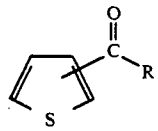

wherein the carbonyl group is substituted at the 2- or 3-position in the thiophene ring and R is H, aromatic or alkyl, having up to 8 carbons.

5. The electrically conductive polythiophenecarbonyl polymer network of claim 4 wherein the carbonyl functional thiophene monomers are the protecting reaction product of ethylene glycol with monomers selected from the group consisting of 2-thiophenecarboxaldehyde, 3-thiophenecarboxaldehyde, and any mixture thereof, free aldehyde functionality of the carbonyl functional polythiophenecarbonyl polymers being regenerated by acid hydrolysis prior to said crosslinking reaction.

6. The electrically conductive polythiophenecarbonyl polymer network of claim 3 wherein the conjugated copolymerization monomers are selected from thiophene, pyrrole, carbonyl functional pyrrole and any mixture thereof.

7. The electrically conductive polythiophenecarbonyl polymer network of claim 2 wherein the conjugated diylide crosslinker is the reaction product of p-xylylene bis(triphenylphosphonium halide) with base.

8. The electrically conductive polythiophenecarbonyl polymer network of claim 1 comprising the condensation crosslinking reaction product of carbonyl functional polythiophenecarbonyl polymers with conjugated polyamine crosslinker.

9. The electrically conductive polythiophenecarbonyl polymer network of claim 8 wherein the conjugated polyamine crosslinker is selected from the group consisting of diaminobenzene, diaminotoluene, diaminoxylene, diaminostilbene, and any mixture thereof.

10. The electrically conductive polythiophenecarbonyl polymer network of claim 1 comprising the self-crosslinking condensation reaction product of carbonyl functional polythiophenecarbonyl polymers.

11. The electrically conductive polythiophenecarbonyl polymer network of claim 10 wherein the self-crosslinking condensation reaction is carried out with trialkylphosphite having alkyl groups of 1 to 6 carbons.

12. The electrically conductive polythiophenecarbonyl polymer network of claim 1 comprising electrical conductivity enhancing dopant.

* * * * *